United States Patent
Manikantan Shila et al.

(10) Patent No.: US 11,934,522 B2
(45) Date of Patent: Mar. 19, 2024

(54) SYSTEM AND METHOD FOR DETECTING MALICIOUS ACTIVITIES AND ANOMALIES IN BUILDING SYSTEMS

(71) Applicant: Carrier Corporation, Palm Beach Gardens, FL (US)

(72) Inventors: Devu Manikantan Shila, Palm Beach Gardens, FL (US); Lingyu Ren, Palm Beach Gardens, FL (US); Mahmoud El Chamie, Palm Beach Gardens, FL (US); Fragkiskos Koufogiannis, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 690 days.

(21) Appl. No.: 16/973,544

(22) PCT Filed: Aug. 27, 2019

(86) PCT No.: PCT/US2019/048275
§ 371 (c)(1),
(2) Date: Dec. 9, 2020

(87) PCT Pub. No.: WO2020/051018
PCT Pub. Date: Mar. 12, 2020

(65) Prior Publication Data
US 2021/0248233 A1    Aug. 12, 2021

Related U.S. Application Data

(60) Provisional application No. 62/726,588, filed on Sep. 4, 2018.

(51) Int. Cl.
*G06F 21/56*    (2013.01)
*G01R 21/00*    (2006.01)
(Continued)

(52) U.S. Cl.
CPC ........... *G06F 21/56* (2013.01); *G01R 21/007* (2013.01); *G06N 5/04* (2013.01); *G06N 20/00* (2019.01); *H04L 63/1416* (2013.01)

(58) Field of Classification Search
CPC ...... G01R 21/007; G01D 4/004; G06F 21/56; G06F 21/566; G06N 20/00; G06N 5/04; H04L 63/1416; Y04S 40/20
See application file for complete search history.

(56) References Cited

U.S. PATENT DOCUMENTS 6,785,592 B1 *   8/2004   Smith ................... H02J 3/008
                                                          705/412
8,305,737 B2 *  11/2012   Ewing ...................... G05F 3/00
                                                            174/59
(Continued)

FOREIGN PATENT DOCUMENTS

CN         105516159         4/2016

OTHER PUBLICATIONS

International Preliminary Report on Patentability for International Application No. PCT/US2019/048275 dated Mar. 18, 2021.
(Continued)

*Primary Examiner* — Sharon S Lynch
(74) *Attorney, Agent, or Firm* — Carlson, Gaskey & Olds, P.C.

(57) ABSTRACT

A system for detecting malicious operation of a building system includes a power characteristic input connected to a plurality of power characteristic sensors, a processor and a memory. The memory stores instructions for operating at least a physics model detection, a machine learning model detection and a combination module. The physics model detection includes multiple predefined expected power characteristics and is configured to detect an anomaly when at least one power characteristic received at the power characteristic input deviates from a corresponding predefined
(Continued)

expected power characteristic of the predefined expected power characteristics. The machine learning model includes a machine learning system configured to learn a set of expected normal power characteristics and detect the anomaly when at least one power characteristic received at the power characteristic input deviates from the learned set of expected normal power characteristics. The combination module is configured to output an alert to at least one technician in response to at least one of the physics model and the machine learning model detecting the anomaly.

20 Claims, 3 Drawing Sheets

(51) Int. Cl.
*G06N 5/04* (2023.01)
*G06N 20/00* (2019.01)
*H04L 9/40* (2022.01)

(56) References Cited

U.S. PATENT DOCUMENTS

| | | | | |
|---|---|---|---|---|
| 8,450,995 | B2* | 5/2013 | Wagner | G01D 21/00 455/67.11 |
| 8,560,256 | B2* | 10/2013 | Gu | G01R 15/202 702/183 |
| 8,712,596 | B2* | 4/2014 | Scott | H04L 63/1433 700/297 |
| 9,251,472 | B1* | 2/2016 | Linowes | F24F 11/49 |
| 9,322,667 | B2* | 4/2016 | Marwah | G01D 4/00 |
| 9,324,022 | B2* | 4/2016 | Williams, Jr. | G06N 3/045 |
| 9,712,549 | B2* | 7/2017 | Almurayh | H04L 63/1425 |
| 9,904,260 | B2* | 2/2018 | Lloyd | G05B 19/0428 |
| 10,554,077 | B2* | 2/2020 | Gray | H02J 3/02 |
| 11,231,999 | B2* | 1/2022 | Halladay | G06F 11/1441 |
| 11,503,386 | B2* | 11/2022 | Petri | H04Q 9/00 |
| 11,774,124 | B2* | 10/2023 | Gray | G06Q 50/06 700/275 |
| 2005/0090995 | A1* | 4/2005 | Sonderegger | H02J 3/003 702/57 |
| 2010/0286937 | A1* | 11/2010 | Hedley | G06Q 50/06 702/60 |
| 2011/0061015 | A1* | 3/2011 | Drees | H02J 13/00016 700/275 |
| 2011/0251933 | A1* | 10/2011 | Egnor | G06Q 50/06 703/2 |
| 2012/0041696 | A1* | 2/2012 | Sanderford, Jr. | G01D 4/004 702/62 |
| 2013/0054183 | A1* | 2/2013 | Afzal | H02J 13/00002 702/141 |
| 2013/0151179 | A1* | 6/2013 | Gray | G01D 4/002 702/62 |
| 2014/0316600 | A1* | 10/2014 | Jammer | H02J 3/322 700/297 |
| 2014/0340236 | A1* | 11/2014 | Rhoads | G06Q 50/06 340/870.02 |
| 2014/0371941 | A1* | 12/2014 | Keller | H02J 13/00006 700/297 |
| 2015/0254555 | A1* | 9/2015 | Williams, Jr. | G06N 3/045 706/14 |
| 2015/0276830 | A1* | 10/2015 | Airaksinen | G01R 22/068 324/74 |
| 2016/0205123 | A1* | 7/2016 | Almurayh | H04L 63/1425 726/23 |
| 2016/0366170 | A1* | 12/2016 | Bell | H04L 63/1425 |
| 2016/0369777 | A1* | 12/2016 | Chiang | G05B 23/024 |
| 2018/0024203 | A1* | 1/2018 | Halladay | H03K 5/26 714/15 |
| 2018/0144815 | A1* | 5/2018 | Chapman-McQuiston | G16H 40/20 |
| 2018/0293367 | A1* | 10/2018 | Urman | G06F 21/32 |
| 2021/0392417 | A1* | 12/2021 | Petri | H04Q 9/00 |

OTHER PUBLICATIONS

Janetzko, Halldór, Florian Stoffel, Sebastian Mittelstädt, and Daniel A. Keim, Anomaly detection for visual analytics of power consumption data, Computers & Graphics, Feb. 2014, p. 27-37, vol. 38, University of Konstanz, Germany.

International Search Report and Written Opinion for International Application No. PCT/US2019/048275 dated Nov. 6, 2019.

* cited by examiner

SYSTEM AND METHOD FOR DETECTING MALICIOUS ACTIVITIES AND ANOMALIES IN BUILDING SYSTEMS

CROSS-REFERENCE TO RELATED APPLICATION

This application claims priority to U.S. Provisional Patent Application No. 62/689,320 filed Jun. 25, 2018.

TECHNICAL FIELD

The present disclosure relates generally to a system and method for detecting malicious operation of a building system based on measurements of the electrical power consumption of the building systems.

BACKGROUND

Buildings, such as university buildings, office buildings, residential buildings, and the like, incorporate multiple electrically powered systems. Some or all of these systems are smart systems including internet, or other network, connectivity which facilitates remote control and operation of the building system through computer networks.

Due to their connections to a computer network, smart building systems can be vulnerable to hacking, malware, or other malicious activity. In addition, smart and non-smart building systems can undergo anomalous behaviors due to malfunctions or other operational irregularities. The anomalous activity can be the result of an individual attempting to attack the building, an individual attempting to use one or more building systems to indirectly attack other building systems, the power grid, or other buildings, or the result of accidental non-malicious activities and malfunctions.

Furthermore, as each smart building system has its own interface, and its own programming, it can be difficult to detect when a building system has become compromised without intruding on the operations of the building systems by including diagnostic software or sensors within the building system itself.

SUMMARY OF THE INVENTION

In one exemplary embodiment, a system for detecting malicious operation of a building system includes a power characteristic input connected to a plurality of power characteristic sensors, a processor and a memory, the memory storing instructions for operating at least a physics model detection, a machine learning model detection and a combination module, wherein the physics model detection is comprised of a plurality of predefined expected power characteristics and is configured to detect an anomaly when at least one power characteristic received at the power characteristic input deviates from a corresponding predefined expected power characteristic of the plurality of predefined expected power characteristics, wherein the machine learning model is comprised of a machine learning system configured to learn a set of expected normal power characteristics and detect the anomaly when at least one power characteristic received at the power characteristic input deviates from the learned set of expected normal power characteristics, and wherein the combination module is configured to output an alert to at least one technician in response to at least one of the physics model and the machine learning model detecting the anomaly.

In another example of the above described system for detecting malicious operation of a building system, the plurality of power characteristic sensors are disposed at a building power grid interconnect, and wherein the building includes a plurality of behind the meter smart building systems.

In another example of any of the above described systems for detecting malicious operation of a building system, the plurality of power characteristic sensors includes at least one of a high fidelity sensor and a low fidelity sensor.

In another example of any of the above described systems for detecting malicious operation of a building system, the plurality of power characteristic sensors includes an input power sensor, an electric current sensor, a voltage sensor, a power factor sensor, a frequency sensor, and a rate of change of frequency sensor.

In another example of any of the above described systems for detecting malicious operation of a building system, the machine learning model includes a spatio-temporal machine learning algorithm.

In another example of any of the above described systems for detecting malicious operation of a building system, the machine learning model is configured to train based on actual detected power characteristics for a predefined period after beginning operation and prior to beginning detection.

In another example of any of the above described systems for detecting malicious operation of a building system, the predefined period is at least two weeks.

In another example of any of the above described systems for detecting malicious operation of a building system, the combination module is configured to prioritize a physics model detection when the machine learning model is immature and is configured to prioritize a machine learning detection when the machine learning model is mature.

In another example of any of the above described systems for detecting malicious operation of a building system, the set of expected normal power characteristics of the machine learning model is continuously adapted via an incremental learning process of the machine learning model.

In another example of any of the above described systems for detecting malicious operation of a building system, the combination module is configured to deactivate at least one building system in response to a detection of a power characteristic anomaly.

In another example of any of the above described systems for detecting malicious operation of a building system, the alert includes a data set indicating the anomalous power characteristic.

In another example of any of the above described systems for detecting malicious operation of a building system, the alert includes at least one building power system corresponding to the type of detected anomaly.

An exemplary method for detecting malicious activity in a smart building system includes detecting power input characteristics of a building including multiple smart building systems behind the meter, comparing the detected power characteristics against a predefined physics model of expected power characteristics and providing an alert to a combination module when at least one detected power characteristic varies from the expected power characteristics, comparing the detected power characteristics against a machine learning model of expected power characteristics and providing an alert to the combination module when at least one detected power characteristic varies from the machine learned expected power characteristics, and outputting an alert from the combination module to a technician in response to the combination module receiving at least one alert.

In another example of the above described exemplary method for detecting malicious activity in a smart building system, detecting the power input characteristics of the building includes detecting power characteristics at a grid interconnect of the building in high fidelity and low fidelity meter.

Another example of any of the above described exemplary methods for detecting malicious activity in a smart building system further includes training the machine learning model for at least a predefined period of time, and wherein the combination module prioritizes alerts from the physics model during the predefined period of time.

In another example of any of the above described exemplary methods for detecting malicious activity in a smart building system, the combination module provides equal weight to alerts from the machine learning model and the physics model during an intermediate period of time after the predefined period of time and before the machine learning model is mature.

In another example of any of the above described exemplary methods for detecting malicious activity in a smart building system, the combination module prioritizes alerts from the machine learning model after the machine learning model is mature.

In another example of any of the above described exemplary methods for detecting malicious activity in a smart building system, outputting the alert from the combination module includes outputting a data set indicative of a deviation between expected power characteristics and actual power characteristics to the technician.

In another example of any of the above described exemplary methods for detecting malicious activity in a smart building system, outputting the alert from the combination module includes identifying at least one building system correlated with the deviation.

Another example of any of the above described exemplary methods for detecting malicious activity in a smart building system, further includes disabling at least one identified building system until a technician has reviewed the deviation.

These and other features of the present invention can be best understood from the following specification and drawings, the following of which is a brief description.

DETAILED DESCRIPTION

Figure 1:
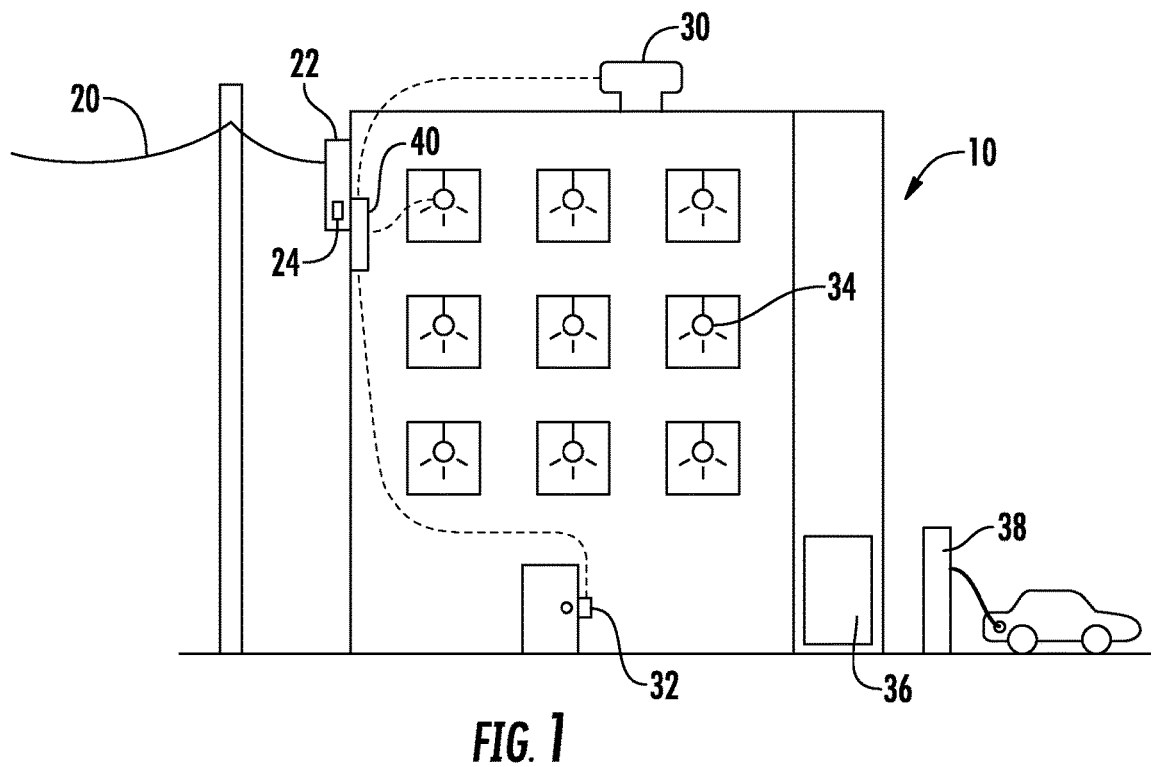
FIG. 1 schematically illustrates a building including multiple smart building systems.

FIG. 1 schematically illustrates a building 10, connected to a power line 20 via a grid interconnect 22. Included within the building 10 are multiple building systems 30, 32, 34, 36, 38, each of which draws operational power from a building power distribution system (hidden). The building power distribution system is connected to the grid interconnect 22, and draws power from the external power grid to power the building systems. Due to the reliance on drawing power through the grid interconnect 22, each of the building systems 30, 32, 34, 36, 38, is referred to as being "behind the meter". In the exemplary embodiment, the building systems include a heating, ventilation, and cooling (HVAC) system 30, a door lock system 32, a lighting system 34, an elevator system 36 and an electrical vehicle charging system 38. The disclosed building systems 30, 32, 34 are purely exemplary in nature and any number of additional behind the meter building systems can be incorporated into the building 10 and receive the benefits of the system and method disclosed herein.

Also included in the building 10 is a computer network 40 connected to some of the building systems 30, 32, 34. In the illustrated example, the smart building systems 30, 32, 34 are connected via wireless connections, although it should be appreciated that any other data connection can be utilized. The computer network 40 is, in turn, connected to an external network, such as the Internet, and allows authorized users to access and control the building systems 30, 32, 34 from remote locations and from throughout the building 10.

Included within the grid interconnect are multiple power sensors 24. By way of example, the power sensors 24 can include current sensors, voltage sensors, frequency detection sensors, active and reactive power sensors, rate of change of frequency sensing systems, and the like. The power sensors 24 are configured to detect the power characteristics of power being provided to the building 10 through the grid interconnect 22. The power sensors 24 include both high fidelity (high sampling rates, such as would be used to detect transient profiles) and low fidelity (such as would be used to detect average power usage at a meter) sensing schemes, and are referred to in the aggregate as mixed fidelity. By using mixed fidelity power sensors 24, the system can detect both transient and quasi steady-state anomalies. Each of the power sensors 24 further provides the sensed data to a malicious activity detection system 200 (illustrated in FIG. 3) through the computer network 40. The malicious activity detection system 200 can then detect malicious activity occurring in one or more of the building systems 30, 32, 34. 36, 38 based on the aggregate power characteristics of the input power.

By positioning the power sensors 24 at the meter, the malicious activity detection system 200 described herein can be combined with other information, like the weather conditions, building operation schedule and the time of the day, to detect and report malicious events, and power parameter anomalies without intruding on the operations or configurations of the building systems 30, 32, 34, 36, 38. Further, this placement allows for the detection to be scalable as new building systems are added and/or old building systems 30, 32, 34, 36, 38 are removed without requiring physical alterations to the inputs or sensors of the detection system 200.

When a cyber-attack or other malicious activity on one or more of the building systems 30, 32, 34, 36, 38 is launched using invalid commands, malware, or by changing the control parameters, the building systems 30, 32, 34, 36, 38 behave abnormally resulting in an anomaly in the power characteristics of the power passing through the grid interconnect 22. By monitoring the input power at a high fidelity (i.e. polling sensors at a frequency of at least 120 Hz for 60

Hz systems or 100 Hz for 50 Hz systems), and at low fidelity (i.e. smart meters at a frequency of 1 sample/minute), the system described herein is able to detect the anomalies, and thus the malicious events, in near real time and report the events to a technician who is able to address or remedy the situation. In some examples, or with certain types of detections, the system 200 can automatically shut off all or a portion of the building systems until a technician has had the opportunity to review the detections.

Figure 2:
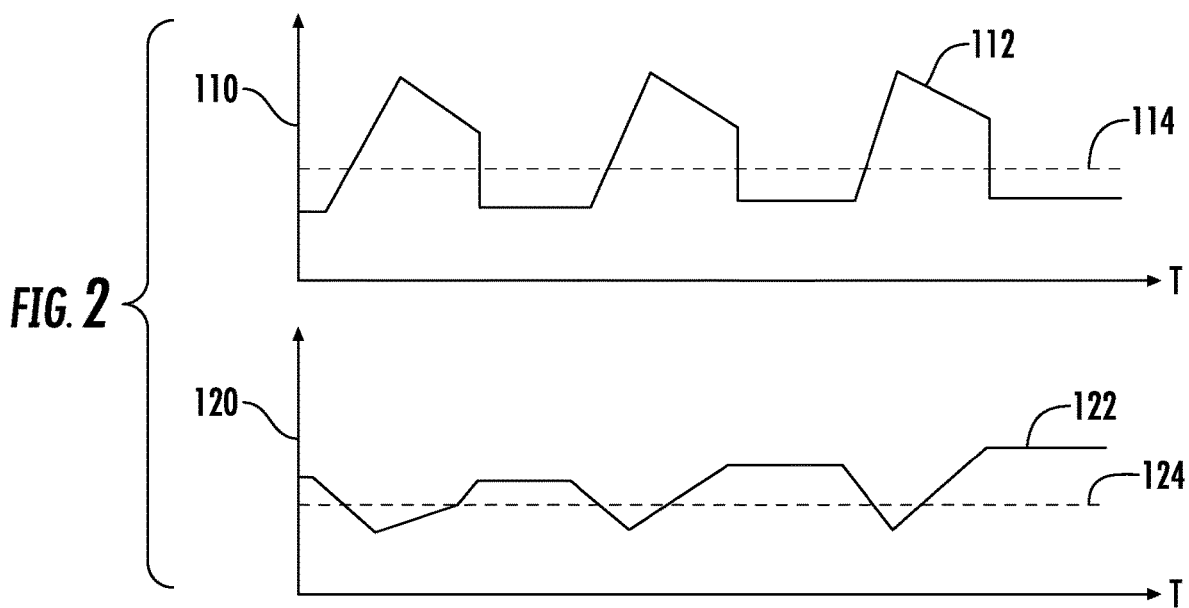
FIG. 2 schematically illustrates exemplary input power characteristics of building of FIG. 1 during expected operations and when one or more building system is compromised.

With continued reference to FIG. 1, FIG. 2 illustrates a simplified example of the power characteristics determined by the power sensors 24. The simplified power characteristics include a transient voltage phasor magnitude 120 illustrating an actual transient voltage phasor magnitude 122 as measured by the power sensors 24, and an expected transient voltage phasor magnitude 124 based on historical trends and/or mathematical models of building operations. The simplified power characteristics also include an active power measurement 110 having actual measured data 112 and an expected baseline 114 for the data. In a practical implementation, additional, power characteristics such as current, frequency, power factor, rate of change of frequency or any other detectable power parameter can be utilized in conjunction with the illustrated parameters.

Figure 3:
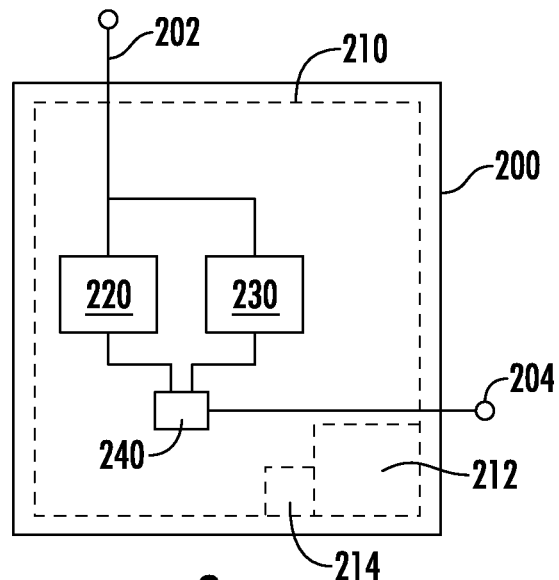
FIG. 3 schematically illustrates a power characteristic monitor system for detecting malicious activity within one or more smart building systems.
Figure 4:
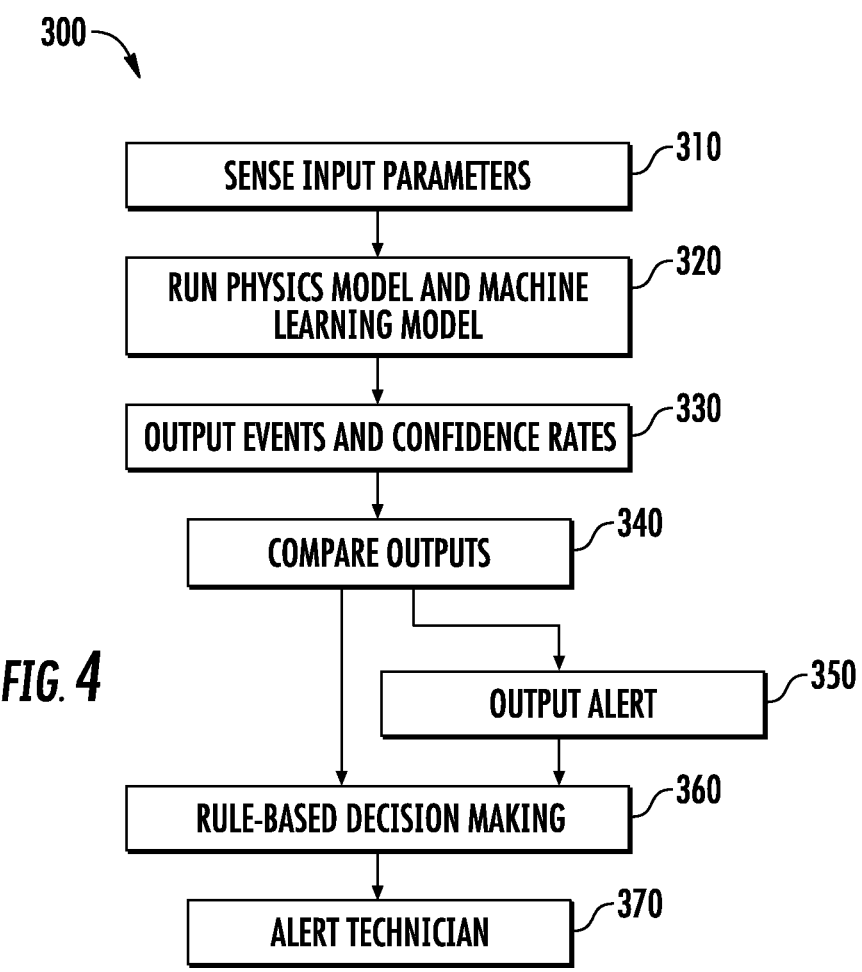
FIG. 4 schematically illustrates a method of detecting the malicious activity using the system of FIG. 3.

The sensed parameters 110, 120 are provided to the malicious activity detection system 200, illustrated schematically in FIG. 3. The detection system 200 includes a computerized system 210 having a memory 212 and a processor 214. Included within the computerized system 210 are a physics based detection model 220 and a machine learning based detection model 230. Each of the physics based detection model 220 and the machine learning based detection model 230 independently evaluates each of the power parameters received via an input 202, and determines whether a malicious event has occurred based on the corresponding model 220, 230, and on the expected power parameters.

Each of the models 220, 230 outputs the detection along with a confidence rate or lack of detection along with confidence rate, to a combination module 240 which combines the detection metrics of the corresponding physics model 220 and the machine learning model 230 to determine if a malicious/abnormal event is occurring. The confidence rate is a score that indicates the probability of a behavior being anomalous. Additionally, the system may perform a root cause analysis or use a rule-based detection technique and indicate which of the building systems is originating the anomalous behavior.

During operation, the physics based model 220 receives the power characteristics from the input 202 and compares each power characteristic and the correlation among different power inputs against a static, predetermined, mathematical model of expected values (i.e. voltages, currents, etc. or their correlations). By way of example, some parameters such as current or power inputs may have a predefined acceptable range correlated to a time of day. The static predetermined rules can be complex or simple and are established based on average expected power parameters and physics-based rules such as Ohm's Law. The amount of deviation of each parameter is combined by the physics model 220 to determine an overall deviation from the expected power characteristics. When the overall deviation exceeds a defined threshold, the physics model determines that a malicious event, or other anomaly, has occurred, and the power characteristics and the malicious event is reported to the combination module 240.

The machine learning model 230 begins with a basic mathematical model of the expected power parameters similar to the physics model 220. In contrast to the physics based model 220, over time, as the machine learning model 230 receives actual power parameters, the expected parameters are trained to match the actual parameters over time of the input power to the building. In one example, the machine learning model 230 utilizes spatio-temporal algorithms (alternatively referred to as time series forecasting or advanced learning methodologies) to train the expected power parameters. In alternative examples, alternative machine learning methods can be utilized to similar effect. Once the machine learning model 230 has had sufficient training (e.g. has been operating and receiving data from the input 202 for at least two weeks), the machine learning model 230 begins comparing the received inputs to the learned expected parameters. When one or more of the power parameters deviates from the learned expected power parameters based on the machine learning model 230, an anomaly is detected, and flagged as a possible malicious event. The parameters and the malicious event are then output to the combination module 240.

In some examples, such as those where the machine learning model 230 has not had sufficient time to fully train, the results of the physics based model 220 can be given more weight than the results of the machine learning based model. By way of example, this could be when the machine learning model 230 has only begun learning up to approximately two weeks into operation.

Alternatively, when the machine learning model 230 has fully matured (e.g. has been in operation for a month or longer) then the results of the machine learning model 230 can be given more weight by the combination module 240.

In yet another alternative, during an intermediate time where the machine learning model 230 has been operating for an initial period, but is not yet fully mature, the combination module 240 can give the results of each model 220, 230 a weight proportional to the reported confidence rate.

Once the combination module 240 has determined that a malicious event is likely to have occurred, the combination module 240 outputs a set of data to a user through an output 204 that is connected to the computer network. The set of data can include all of the power parameters within a set time frame (e.g. 5 minutes) when the anomaly occurred, or can include only the parameters that deviated from the expected parameters. A technician can then view the parameters and determine a best guess as to what building system(s) are undergoing the malicious event, and those building system(s) 30, 32, 34, 36, 38 can be inspected more closely.

In some examples, the detection system 200 can include instructions stored within the memory 212 correlating specific types of deviation from the expected behavior with specific types of malicious events or with specific building systems corresponding to the specific events. These correlations can be learned over time, or predetermined, or a combination of both. In examples including this feature, the set of data output can further include one or more building systems that it is suggested for the technician to inspect first, with the one or more building systems being the building systems correlated with the type of power anomaly.

With continued reference to FIGS. 1-3, FIG. 4 is a flowchart illustrating the process 300 for detecting an anomaly and reporting the anomaly to a technician in a system 200 where the machine learning model 230 has been fully trained. Initially, the power parameters are sensed in high fidelity by the power sensors 24 in a "sense input parameters" step 310. The input parameters are provided to each of the physics model 220 and the machine learning model 230, which check for anomalous behavior using their corresponding methodologies.

When either model 220, 230 detects an anomalous input power characteristic, the corresponding model provides a malicious event alert and the corresponding confidence rate to a combination module 240 in an "Output Events and Confidence Rates" step 330. When the combination module 240 receives an alert, the module 240 compares the confidence rate outputs from each of the physics model 220 and the machine learning model 230. The confidence rates of each model represent the confidence of the corresponding model that the event which occurred was a malicious event. Once an anomaly is detected the system compares the event with a data-base of predefined behavioral rules of each building. This comparison helps reduce the false alarms of data-driven systems. If both models have indicated the presence of an anomalous event, and the indication is of sufficient confidence level, the combination module 240 provides an alert to a technician that a malicious event is occurring. The alert can be in the form of an SMS message, an e-mail, a phone call, a pop up message in the control room of the building, or any other notification system. When trained with sufficient information, the combination module 240 can further inform the technician which of one or more building systems is most correlated with the type of power anomaly simultaneously with providing the alert.

When one model 220, 230 outputs an alert and the other model 220, 230 does not output an alert, the combination module performs a tiebreaker analysis in a "Perform Tiebreaker" step 350. The tiebreaker fuses confidence rates from the two models 220, 230 across a time window. For example, as described above, when the machine learning model 230 is sufficiently trained, priority is given to the machine learning model 240. In certain examples, or with certain types of expected anomalies, exceptions can be made to the tie breaker analysis, or the length of time required before the machine learning model is considered to be fully trained for that specific type of anomaly can be different from other types.

Once the tie breaker has been performed, if the combination module 240 determined that the model 220, 230 with the higher priority detected an anomaly, the system proceeds to step 360 where a rule based decision making process is performed to automatically indicate the sources of anomaly, e.g. a sudden change of HVAC fan speed. Once the source of the anomaly has been determined, the alert and the identified building system will be sent to an "Alert Technician" step 370.

As a further benefit of utilizing the machine learning module 230, the expected power characteristics of the building systems 30, 32, 34 are continuously adapted in the machine learning model, and the malicious event detection system can account for seasonal variations in expected power characteristics. By way of example, the power characteristics of an air conditioner system will differ from those of a heating system, and the corresponding effect on the buildings power system will be distinct between a winter season and a summer season. Further, the machine learning profile can gradually adjust along with the seasons, rather than being limited to rigidly defined seasonal models that have strict time and date cutoffs, as would be required in the physics model 220.

Figure 5:
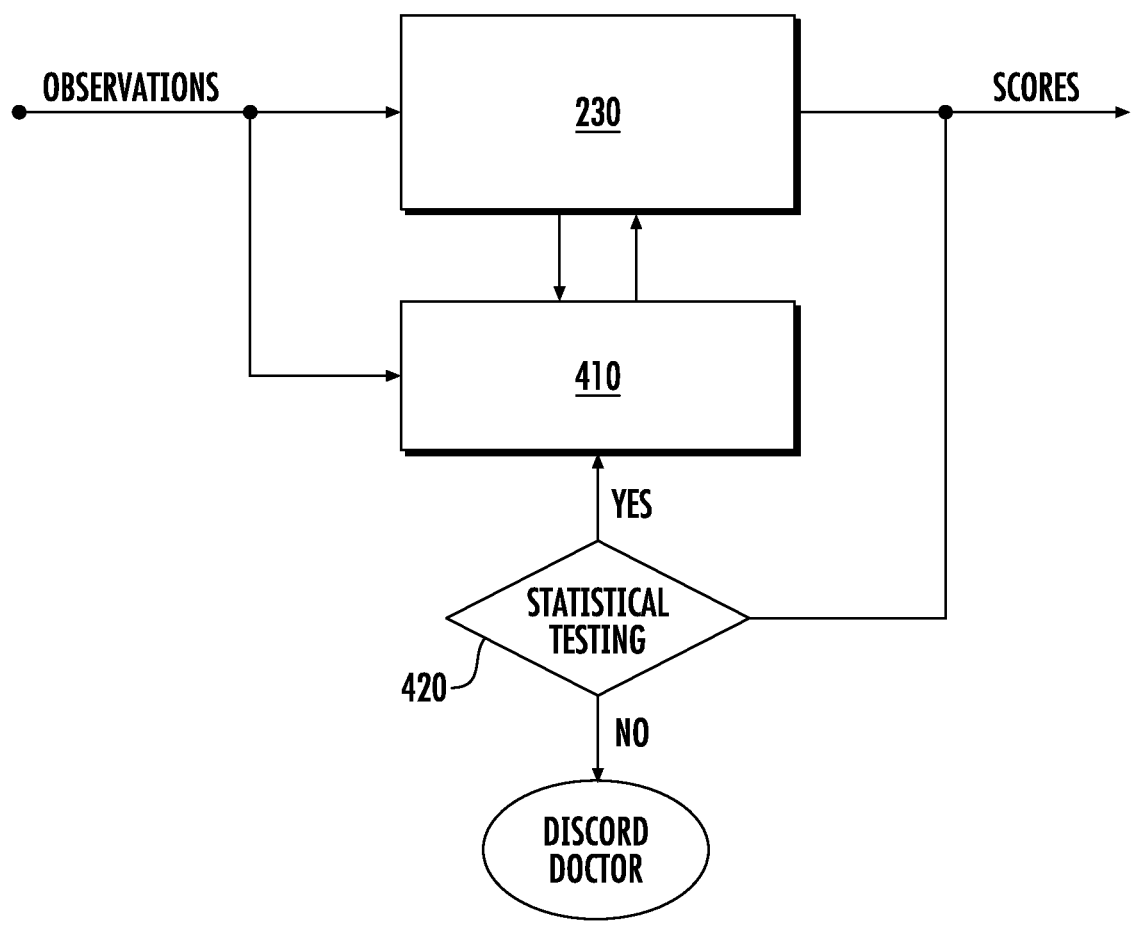
FIG. 5 schematically illustrates an exemplary incremental learning process for a machine learning module.

The machine learning module 230 utilizes an incremental learning algorithm to incorporate new training data into the learned model. FIG. 5 illustrates an example of the incremental learning process, with the sensed power characteristics (observations) being provided to both the machine learning module 230 and an incremental training step 410. Seasonal variations, changes in the building systems, or the usage patterns of them are learned after the initial deployment of the systems, and are based on the actual operational data of the building being monitored. The incremental learning step 410 is executed periodically, for example every 4 hours. Each time the incremental learning step 410 is executed, a statistical testing step 420 is used to monitor the incremental learning step 410 and prevent the machine learning module from learning using data that included an anomalous activity detection. Specifically, when the training data of the last period includes data marked as anomalous, the incremental learning step 410 is not performed.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention. The system allows for a hierarchical structure for a collection of buildings. Each building is monitored for anomalies by a local instance of the system. The confidence rates across the buildings are then fused to detect attacks to whole collection of buildings and improve the detection rate.

The invention claimed is:

1. A system for detecting malicious operation of a building system comprising:
   a power characteristic input connected to a plurality of power characteristic sensors;
   a processor and a memory, the memory storing instructions for operating at least a physics detection model, a machine learning detection model and a combination module;
   wherein the physics detection model is comprised of a plurality of predefined expected power characteristics and is configured to detect an anomaly when at least one power characteristic received at the power characteristic input deviates from a corresponding predefined expected power characteristic of the plurality of predefined expected power characteristics;
   wherein the machine learning detection model is comprised of a machine learning system configured to learn a set of expected normal power characteristics and detect the anomaly when at least one power characteristic received at the power characteristic input deviates from the learned set of expected normal power characteristics;
   wherein each of the physics detection model and the machine learning detection model separately determine whether there is an anomaly, and wherein when at least one of the physics detection model and the machine learning detection model detects an anomalous power characteristic input, the at least one of the physics detection model and the machine learning detection model provides a malicious event alert and a corresponding confidence rate to a combination module; and
   wherein the combination module, once a malicious event is detected,
      if both the physics detection model and the machine learning detection model have indicated a presence of the malicious event and a predetermined confidence level is achieved, the combination module is configured to output an alert, or if only one of the physics detection model and the machine learning detection model have indicated a presence of the malicious event, the combination module performs a tiebreaker analysis based on confidence rates from the physics detection model and the machine learning detection model across a time window to determine whether to output the alert.

2. The system of claim 1, wherein the plurality of power characteristic sensors are disposed at a building power grid interconnect, and wherein the building includes a plurality of behind the meter smart building systems.

3. The system of claim 2, wherein the plurality of power characteristic sensors includes at least one of a high fidelity sensor and a low fidelity sensor, wherein power parameters are sensed in high fidelity as sense input parameters that are provided to each of the physics detection model and the machine learning detection model.

4. The system of claim 2, wherein the plurality of power characteristic sensors includes an input power sensor, an electric current sensor, a voltage sensor, a power factor sensor, a frequency sensor, and a rate of change of frequency sensor.

5. The system of claim 1, wherein the machine learning detection model includes a spatio-temporal machine learning algorithm.

6. The system of claim 1, wherein the machine learning detection model is configured to train based on actual detected power characteristics for a predefined period after beginning operation and prior to beginning detection.

7. The system of claim 6, wherein the predefined period is at least two weeks.

8. The system of claim 1, wherein the combination module is configured to prioritize a physics model detection when the machine learning detection model is immature and is configured to prioritize a machine learning detection when the machine learning detection model is mature.

9. The system of claim 1, wherein the set of expected normal power characteristics of the machine learning detection model is continuously adapted via an incremental learning process of the machine learning detection model.

10. The system of claim 1, wherein the combination module compares the malicious event with a data-base of predefined behavioral rules of each building, and wherein the combination module is configured to deactivate at least one building system in response to a detection of a power characteristic anomaly.

11. The system of claim 1, wherein the alert includes a data set indicating the anomalous power characteristic.

12. The system of claim 1, wherein the alert includes at least one building power system corresponding to a type of detected anomaly.

13. A method for detecting malicious activity in a smart building system comprising:
    detecting power input characteristics of a building including multiple smart building systems behind a meter;
    comparing detected power characteristics against a predefined physics model of expected power characteristics and providing an alert to a combination module when at least one detected power characteristic varies from the expected power characteristics;
    comparing the detected power characteristics against a machine learning model of expected power characteristics and providing an alert to the combination module when at least one detected power characteristic varies from the machine learned expected power characteristics;
    each of the physics model and the machine learning model separately determining whether there is an anomaly, and wherein when at least one of the physics model and the machine learning model detects an anomalous power characteristic input, the at least one of the physics model and the machine learning model provides a malicious event alert and a corresponding confidence rate to a combination module; and
    once a malicious event is detected
        if both the physics model and the machine learning model have indicated a presence of the malicious event and a predetermined confidence level is achieved, outputting an alert from the combination module, or
        if only one of the physics model and the machine learning model have indicated a presence of the malicious event, performing a tiebreaker analysis with the combination module based on confidence rates from the physics model and the machine learning model across a time window to determine whether to output the alert.

14. The method of claim 13, wherein detecting the power input characteristics of the building comprises detecting power characteristics at a grid interconnect of the building in high fidelity and low fidelity meter, and including sensing power parameters in high fidelity as sense input parameters, and providing the sense input parameters to each of the physics model and the machine learning model.

15. The method of claim 13, further comprising training the machine learning model for at least a predefined period of time, and wherein the combination module prioritizes alerts from the physics model during the predefined period of time.

16. The method of claim 15, wherein the combination module provides equal weight to alerts from the machine learning model and the physics model during an intermediate period of time after the predefined period of time and before the machine learning model is mature.

17. The method of claim 16, wherein the combination module prioritizes alerts from the machine learning model after the machine learning model is mature.

18. The method of claim 16, wherein outputting the alert from the combination module comprises outputting a data set indicative of a deviation between expected power characteristics and actual power characteristics to a technician.

19. The method of claim 18, wherein outputting the alert from the combination module comprises identifying at least one building system correlated with the deviation.

20. The method of claim 19, further comprising using the combination module to compare the malicious event with a data-base of predefined behavioral rules of each building, and including, based on the comparison, disabling at least one identified building system until a technician has reviewed the deviation.

* * * * *